B. C. BLIVEN.
GREASE GUN.
APPLICATION FILED SEPT. 24, 1919.
1,390,011.
Patented Sept. 6, 1921.
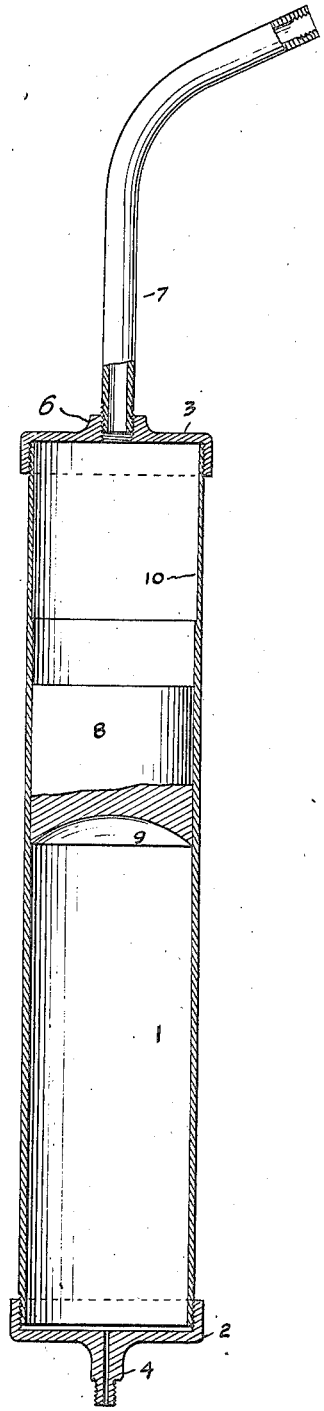
INVENTOR
B. C. BLIVEN
BY
ATT'Y.

UNITED STATES PATENT OFFICE.

BERTRAND C. BLIVEN, OF SAN FRANCISCO, CALIFORNIA.

GREASE-GUN.

1,390,011. Specification of Letters Patent. Patented Sept. 6, 1921.

Application filed September 24, 1919. Serial No. 326,049.

*To all whom it may concern:*

Be it known that I, BERTRAND C. BLIVEN, a citizen of the United States, residing at San Francisco, in the county of San Francisco and State of California, have invented new and useful Improvements in Grease-Guns, of which the following is a specification.

The present invention relates to improvements in grease guns for applying grease for lubricating purposes to machinery, especially to the differential and transmission devices of automobiles.

The means at present in general use for applying grease to such devices entails the expenditure of a considerable amount of manual labor, being operated entirely by hand, and the process of operating such a grease gun is not only laborious, but is incapable of being carried out without covering the operator with a considerable amount of grease and dirt. One object of the invention is, therefore, to provide a grease gun which can be operated by the compressed air stored in all garages, so that the operation of applying the lubricating material by means of said grease gun will entail no more manual labor than that of directing the grease to the required location and applying the compressed air hose to the gun.

A further object is to provide a grease gun, the plunger of which will be so formed as to permit of its being actuated in all positions by the compressed air. A further object is to provide such a gun which will be safe against high pressure of the compressed air.

In the accompanying drawing, the figure is a vertical section, certain parts being shown in side elevation, of my improved grease gun.

Referring to the drawing, 1 indicates the cylinder of the gun closed at the ends by caps or heads 2, 3. The cap 2 has a central apertured boss 4, on applying to which the valve in common use on the end of the air hose which is used for supplying compressed air to pneumatic tires, said valve opening automatically when applied to said tires, the valve will automatically open when applied to said boss 4. The other cap 3 has a central apertured boss 6 into which is screwed a spout 7 for directing the grease to any spot desired. 8 indicates a plunger in the cylinder, which, at the end 9 nearest the cap 2 is concave.

I have found that, when this plunger is made with a flat end next the cap 2, and the cylinder is filled with grease, so that said plunger closes the aperture through the boss 4, the air flowing through said aperture has not sufficient force to move the plunger and the grease in front thereof. By making the end of the plunger nearer to the cap 2 concave, the air issuing from the aperture in the boss 4 will be supplied to all parts of the end of the plunger and so furnish sufficient power to expel the grease from in front of the plunger.

The plunger fits closely in the cylinder except at its front end, where the cylinder is milled out, as shown at 10, so as to be of a larger internal diameter than the remainder of the cylinder. The object of this arrangement is to permit the air to escape around the plunger and out through the spout when all the grease has been expelled. Otherwise, there would be danger of bursting the cylinder, owing to the high pressure, more than one hundred pounds to the square inch, of the compressed air which would be confined therein.

The cylinder is made to contain sufficient grease for one complete lubrication of the differential and transmission mechanisms, and is, therefore, of such a size that, if made strong enough to resist the full power of the air, it would be so heavy as to be burdensome to the operator. I have preferred to make it of lighter construction and to avoid the danger of bursting by permitting the compressed air to flow around the plunger and out through the spout when all of the grease has been expelled therefrom.

I claim :—

A grease gun comprising a cylinder, a plunger in said cylinder, heads at the ends of the cylinder, a spout attached to one of said heads and an apertured boss attached to another head, said cylinder having the end remote from said boss enlarged circumferentially interiorly to permit air to escape around the plunger and out through the spout when all the grease has been expelled.

BERTRAND C. BLIVEN.